A. C. PILKINGTON AND J. GASKELL.
APPARATUS FOR GATHERING GLASS FROM A MOLTEN MASS.
APPLICATION FILED MAR. 10, 1922.
1,417,684.
Patented May 30, 1922.
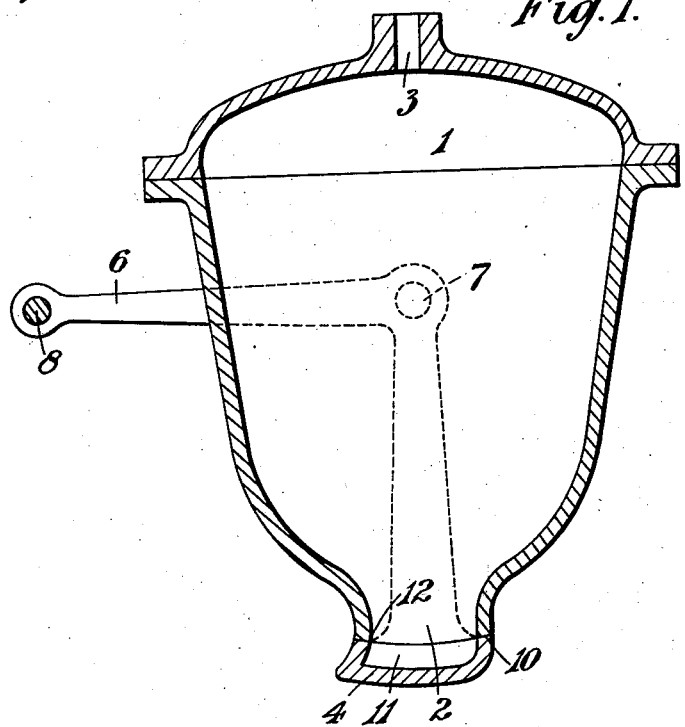
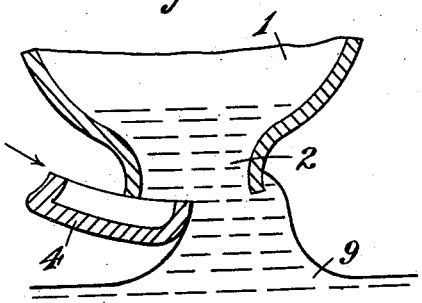
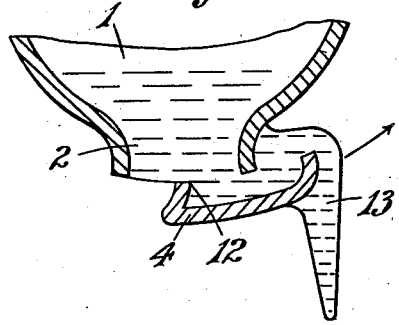
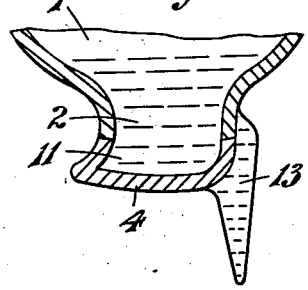
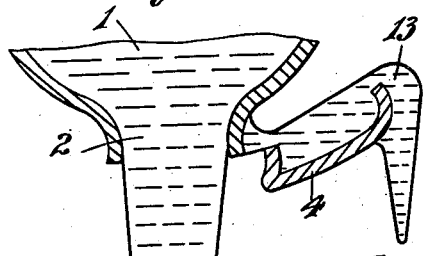

UNITED STATES PATENT OFFICE.

ALFRED CECIL PILKINGTON, OF RAINHILL, AND JOSEPH GASKELL, OF ST. HELENS, ENGLAND, ASSIGNORS TO PILKINGTON BROTHERS LIMITED, OF ST. HELENS, LANCASTER, ENGLAND, A COMPANY OF GREAT BRITAIN.

APPARATUS FOR GATHERING GLASS FROM A MOLTEN MASS.

1,417,684.             Specification of Letters Patent.        Patented May 30, 1922.

Application filed March 10, 1922. Serial No. 542,640.

*To all whom it may concern:*

Be it known that we, ALFRED CECIL PILKINGTON and JOSEPH GASKELL, both subjects of the King of the United Kingdom of Great Britain and Ireland, and residing, respectively, at "Briars Hey," Rainhill, and "Stockswell," Hard Lane, St. Helens, both in the county of Lancaster, England, have invented new and useful Improvements in Apparatus for Gathering Glass from a Molten Mass, of which the following is a specification.

This invention relates to apparatus for gathering glass from a molten mass and delivering it at any desired point, and it has for its object an improved device for delivering the glass free of dirt and chilled glass and, in particular, for gathering and delivering the large quantities of glass required for casting discs for searchlight mirrors, in which homogeneity of the glass is of great importance.

The device which forms the subject of this invention is of the pipette type, that is to say, of the type in which the glass is drawn into the gathering vessel either by immersing its mouth into the molten glass and exhausting the air from the upper part of the vessel or by immersing the vessel into the molten glass while the upper part of the vessel is open to the air, and then withdrawing it after closing the opening to the air. The said vessel is hereinafter called the "pipette."

In the accompanying drawings:—

Figure 1 is a vertical section through the centre of the pipette;

Figure 2 shows, in vertical section, the mouth the pipette immediately above the molten glass in a tank with the obturator partially closing the mouth;

Figure 3 shows, also in vertical section, the mouth of the pipette after filling with glass and with the mouth completely closed;

Figure 4 shows, also in vertical section, the mouth of the pipette partially opened by the obturator, and Figure 5 shows, also in vertical section, the pipette delivering glass.

Referring to the drawings, 1 is the pipette, 2 its mouth, 3 the aperture by which the air is exhausted from, or admitted to, the pipette, 4 the piece which is adapted to close the mouth of the pipette, herein called the obturator.

The obturator 4 is attached to two arms of which one, 5, is shown in dotted lines, pivoted on two pins on the outside of the pipette, of which one, 7, is shown in dotted lines. The two arms 5, are attached to two arms, of which one, 6, is shown, which are connected together by a rod 8 serving as a handle. The mouth 2 of the pipette and the upper surface of the obturator have surfaces which are cylindrical about the centre 7.

The pipette is filled by inserting its mouth, then uncovered by the obturator 4, into the molten glass 9 and exhausting the air in the pipette; the pipette is then withdrawn from the glass and its mouth is immediately closed by moving the obturator 4 in the direction of the arrow in Figure 2. The forward edge 10 of the obturator acts as a cutting edge to shear off the glass drawn up by the pipette.

The obturator 4 has a cavity 11 in its upper surface, and, when the obturator has closed the mouth of the pipette, as shown in Figure 3, the glass in the pipette descends to fill the cavity. The pipette is then carried to the point at which its contents are to be delivered, and its mouth is opened to permit delivery by moving the obturator in the same direction as it was moved to close the mouth, that is to say, in the direction of the arrows in Figures 2 and 4.

In so moving, the inner back edge 12 of the obturator acts as a cutting edge to shear off the small quantity of glass which has entered the cavity 11, in the obturator, from the main body of glass in the pipette, as shown in Figure 4. At the same time the strings of chilled glass 13, which are hanging from the forward edge of the obturator and from the mouth of the pipette near this edge, are removed with the obturator away from the mouth of the pipette, thus allowing the glass in the pipette to discharge without coming into contact with any of the chilled glass adhering to the outside of the pipette or obturator.

The portion of glass at the bottom of the closed pipette, which becomes chilled by reason of its being in contact with the obturator, is contained in the cavity 11 of the obturator and is removed therewith on opening the pipette.

The delivery of glass from the pipette is become chilled, either through contact with the inner surface of the obturator or through adhering to the outside of the pipette or obturator.

The obturator may be operated to open and close the pipette, by any suitable mechanism provided that it slides across the mouth of the pipette.

Having described our invention, we declare that what we claim and desire to secure by Letters Patent is:—

1. In apparatus for gathering glass, of the pipette type, an obturator adapted to contain a small quantity of glass.

2. In apparatus for gathering glass, of the pipette type, an obturator adapted to contain a small quantity of glass, means operative to slide the said obturator over the mouth of the pipette to open it, and an inner back edge on the said obturator adapted, on so sliding the latter, to shear off from the glass in the mouth of the pipette, the small quantity of glass in the obturator.

3. In apparatus for gathering glass, of the pipette type, an obturator adapted to contain a small quantity of glass, means operative to slide the said obturator over the mouth of the pipette to close it and means for sliding the said obturator in the same direction to open the pipette.

4. In apparatus for gathering glass, of the pipette type, an obturator adapted to contain a small quantity of glass, means operative to slide the said obturator over the mouth of the pipette to close it, means operative to slide the said obturator in the same direction to open the pipette, and an inner back edge on the said obturator adapted on so sliding the latter, to shear off from the glass in the pipette the small quantity of glass in the obturator.

5. In apparatus for gathering glass of the pipette type, an obturator adapted to contain a small quantity of glass, means operative to slide the said obturator over the mouth of the pipette to close it, a front edge on the obturator adapted, on so sliding the latter, to shear off the glass in the pipette from that drawn up from the tank, means operative to slide the obturator over the mouth of the pipette to open it, and an inner back edge on the obturator adapted, on so sliding the latter, to shear off from the glass in the mouth of the pipette, the small quantity of glass in the obturator.

6. In apparatus for gathering glass of the pipette type, an obturator adapted to contain a small quantity of glass, means operative to slide the said obturator over the mouth of the pipette to close it, a front edge on the obturator adapted, on so sliding the latter, to shear off the glass in the pipette from that drawn up from the tank, means operative to slide the obturator in the same direction over the mouth of the pipette to open it, and an inner back edge on the obturator adapted, on so sliding the latter, to shear off from the glass in the mouth of the pipette, the small quantity of glass in the obturator.

In testimony whereof we have hereunto subscribed our names.

ALFRED CECIL PILKINGTON.
JOSEPH GASKELL.